Feb. 28, 1933. E. M. BROGDEN ET AL 1,899,606
PREPARATION OF FRESH FRUIT FOR MARKET
Filed March 2, 1925
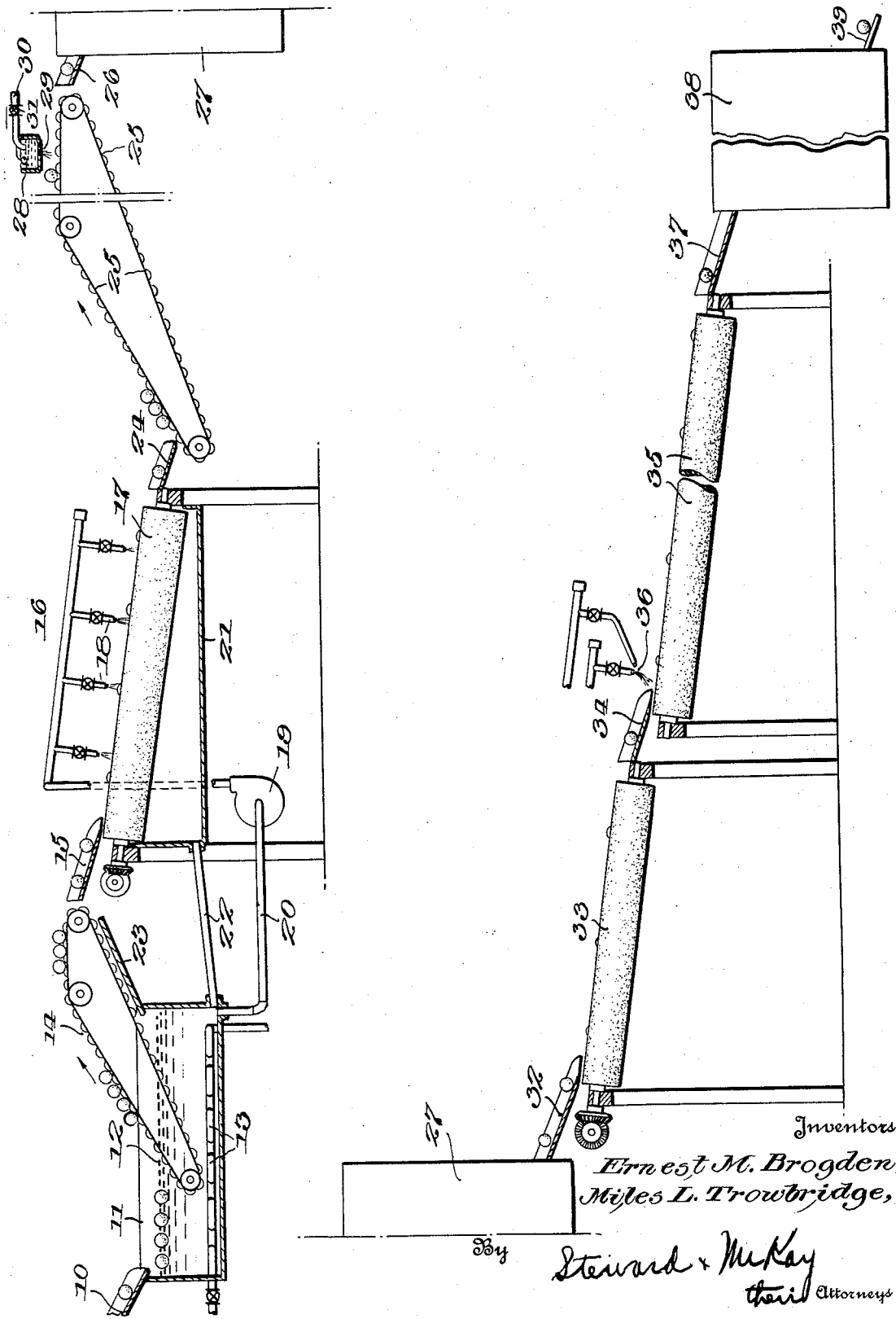
Inventors
Ernest M. Brogden,
Miles L. Trowbridge,
By Steward & McKay
their Attorneys Patented Feb. 28, 1933

1,899,606

UNITED STATES PATENT OFFICE

ERNEST M. BROGDEN, OF SANTA MONICA, AND MILES L. TROWBRIDGE, OF PALMS, CALIFORNIA, ASSIGNORS TO BROGDEX COMPANY, OF WINTER HAVEN, FLORIDA, A CORPORATION OF FLORIDA

PREPARATION OF FRESH FRUIT FOR MARKET

Application filed March 2, 1925. Serial No. 12,779.

This invention relates to preparation of fresh fruit for market; and in particular it relates to the treatment of fresh fruits that are marketed and ordinarily consumed in uncooked condition, especially oranges, lemons, grapefruit, tangerines, and other citrus fruits, in such manner that the destructive action of molds and other organisms producing decay or rot is prevented or inhibited either wholly or to such a substantial extent as greatly to prolong the marketable life of the fruit; the complete treatment most desirably but not necessarily also including a step of providing the fruit with a very thin film-like continuous coating of protective material comprising a waxy substance, such as paraffin for example.

The greatest present utility of the invention is in the treatment of fresh citrus fruits such as those above mentioned. The invention is also applicable, however, to the treatment of apples and other fruits that are attacked by mold or other rot organisms. Furthermore, the invention in its broader aspects extends to the treatment of vegetables, such as tomatoes or the like, that can be treated to advantage in accordance with the principles of the invention to be more fully hereinafter set forth, and accordingly the term "fruit" as herein employed is not to be understood as restricted to fruit in the narrow sense of this word but rather in a broad sense to include vegetables as well.

It is a well-known fact that in the shipping and marketing of citrus fruits, for example, heavy losses occur through decay in the form of blue mold rot, stem end rot, and other forms of rot to which oranges and the like are subject to a greater or less extent. It will be understood that the names herein applied to the various forms of decay or rot mentioned are employed with the meaning and scope customarily given them in the practical art to which this invention relates. Decay in commercial shipments of citrus fruits amounts very commonly to from 5 to 10 per cent, and in many instances it is considerably higher, often running as much as 15 to 20 per cent if the fruit is "weak" as it is at certain seasons. Blue mold is responsible for the greater part of these decay losses, and it will therefore be more particularly referred to hereinafter by way of a concrete example. It is also well-known that until recently no practical solution of the problem of preventing or controlling the destructive action of blue mold and the like has been known, notwithstanding prolonged study and investigation of the problem by recognized experts in the art extending over many years. Careful handling of the fruit in picking and packing, in order to avoid scratches, bruises and other mechanical injuries, and thus to reduce the liability to infection by blue mold spores, has been the principal suggestion of value that such experts have advanced; and while the percentage of decay in fruit shipments can in some measure be kept down by careful handling, it cannot thereby be eliminated or prevented from being large in many instances. Shipment under ice, involving pre-cooling and refrigeration, has also been suggested and serves to temporarily check blue mold growth while the fruit is in transit to market, but upon removal from refrigeration, the blue mold develops at an accelerated rate and destruction of infected fruit is even more rapid than where refrigeration has not been used. Refrigeration therefore is in effect merely an expedient for transferring the loss from the shipper to the receiver.

It has been found by the present applicants that the blue mold and other forms of decay in fresh citrus and other fruits can be materially reduced and in most cases practically eliminated by subjecting the fresh fruit to the action of an aqueous treating solution containing dissolved therein a substantial quantity of an alkali-metal borate, such as borax, together with a substantial quantity of another alkaline reagent such as an alkali-metal carbonate or hydrate. The employment of an alkali-metal carbonate is generally to be recommended because of the fact that it possesses excellent mold-inhibiting properties while at the same time there is less risk of burning or otherwise adversely affecting the skin of the fruit than is involved in the use of an alkali-metal hydrate. Sodium carbonate is especially suitable and may be employed to advantage in the form of ordinary commercial soda-ash of good quality.

The combination of borax and sodium carbonate in a treating solution is found to give an extremely effective mold-inhibiting action, the presence of the sodium carbonate apparently supplementing the mold-inhibiting action of borax to a notable extent. Furthermore, the presence of the sodium carbonate in the treating solution improves its cleansing or detergent action on fruit considerably, so that not only does the solution when properly applied to the fruit render it substantially immune to decay due to blue mold and the like, but where the fruit as it comes from the grooves carries greasy or oily smudge or soot, as it sometimes does, the fruit is more easily and perfectly cleaned and is of better color than where the treating solution contains only borax.

The portions of borax and sodium carbonate in the solution may be varied considerably depending upon the character of the fruit to be treated and the precise method employed for applying the treating solution thereto. For example, an aqueous solution made up by dissolving 10 ounces of borax and 2 ounces of soda-ash to each gallon of water has an excellent mold-inhibiting effect and good cleansing or detergent qualities. Excellent results are also obtained with solutions containing equal proportions of borax and sodium carbonate. Thus, 3 ounces of borax and 3 ounces of sodium carbonate per gallon effectively stops blue mold and the solution has good cleansing properties. A solution containing 6 ounces of borax and 6 ounces of sodium carbonate to the gallon is also very effective in its mold-inhibiting action and is especially satisfactory in its cleansing action. As a rule it is not advisable to use more than 12 ounces of sodium carbonate to the gallon as larger proportions sometimes adversely affect the appearance of the fruit. Borax does not appear to have such action on the fruit but for all practical purposes it is unnecessary to employ it in proportions greater than 12 ounces per gallon; in fact smaller proportions are generally entirely satisfactory. For the attainment of consistently satisfactory results, however, the treating solution should contain at least 2 ounces each per gallon, of borax and sodium carbonate.

Excellent results have also been obtained in some cases where the treating solution contains not only borax and sodium carbonate but also sodium bisulfite, the inclusion thereof in the treating solution being sometimes of special advantage when the treating solution is applied to the fruit under super-atmospheric pressure. In a typical instance, the solution may contain, per gallon, 7 ounces of borax, 3 ounces of sodium bisulfite, and 2 ounces of sodium carbonate. Another good formula is 6 ounces of borax, 3 ounces of sodium bisulfite, and 3 ounces of sodium carbonate, per gallon. In another instance the solution may contain 4 ounces of each of the three reagents per gallon, and a solution containing 2 ounces of each per gallon is also effective in reducing blue mold decay but is somewhat lower in detergent action.

In employing any of the solutions hereinabove referred to, it is important that the fruit remain thoroughly wet with the solution for at least two or three minutes in order to afford ample opportunity for the solution to gain access to all exposed rind tissues and effectively impregnate the same with the mold-inhibiting agents. In practice, it is seldom necessary that the treating period total more than 12 to 15 minutes, however, and from 5 to 10 minutes is usually amply sufficient especially if the solution be applied warm as it should be in order to ensure the attainment of uniformly dependable results. It is advantageous to maintain the treating solution at somewhat above 100° F. but insufficiently high to scald or cook the fruit, temperatures ranging from 110° to 120° F. being particularly advantageous, and 115° F. being a good working average.

The results obtained in the practice of the invention are usually most satisfactory where the fruit is initially treated with the mold-inhibiting solution before it has been washed or otherwise wetted with water or other liquid of non-mold-inhibiting character. This is because the exposed rind tissues of the fruit, through which mold spores and the like generally gain access, are ordinarily more or less completely dried out by the time the fruit is ready to be put through the sequence of packing house operations and therefore such tissues are in a highly absorptive condition and ready to take up with avidity any liquid with which the fruit is brought into contact. By avoiding any wetting of the fruit prior to treatment with the mold-inhibiting solution, such solution can be relied upon to penetrate and impregnate the absorptive exposed rind tissues in its full strength and thus to exercise a maximum mold-inhibiting effect; whereas if said tissues are more or less saturated with wash water or the like before treatment with the mold-inhibiting solution, the action of said solution is somewhat less certain and effective and under some circumstances may even be practically nil. However, if precautions be taken to apply the mold-inhibiting solution to the fruit under super-atmospheric pressure, thus securing more complete and uniform impregnation of the exposed rind tissues, reasonably good results can be obtained even where the fruit has been previously washed or wetted with plain water. As stated, however, initial treatment of the unwashed or unwetted fruit as it is received from the grove is to be recommended as decidedly better practice.

After treatment with the mold-inhibiting solution, the fruit may desirably be provided with a very thin film-like protective coating of waxy material for the purpose of maintaining the fruit in firm, plump and unwithered condition. While this further treatment of the fruit is not an essential feature of the invention in its broader aspects, it offers distinct advantages especially during those parts of the shipping season when the fruit is very ripe.

While the process of the invention may be carried out with the aid of various types of apparatus, one desirable practical form of apparatus installation that gives satisfactory results in treating oranges, for example, is shown more or less schematically and diagrammatically in side elevation in the accompanying drawing. In using this apparatus system to carry out the new process, fruit, which in this particular instance will be assumed to be unwashed fruit just as it is received from the grower, is delivered over chute board 10 into wash tank or soaking tank 11 containing a water solution containing sodium carbonate and borax and prepared by dissolving commercial soda-ash and borax in water in the proportions of about 6 ounces of each per gallon, for example, the level of the liquid in the tank being indicated at 12. The solution may be suitably warmed, to a temperature of around 115° to 120° F., for example, by suitable heating means such as steam coils 13. The fruit dumped into the soaking tank 11 floats gradually toward an elevator of any suitable type, conventionally indicated at 14, the fruit being thoroughly wetted with the treating solution en route. The elevator conducts the wet fruit up out of the tank and delivers it over chute board 15 to a fruit washer 16, which in the present instance comprises rotary cylindrical brush rolls 17 mounted substantially in the same plane and cooperating in one or more pairs to provide a fruit runway or runways inclined slightly downward from the receiving end of the washer device. As the fruit passes down along the brush rolls it is thoroughly rubbed thereby and at the same time is sprayed with more of the warm treating solution supplied through overhead spray jets 18 by a pump 19 which draws its supply through pipe 20 from soaking tank 11. The excess solution falls from the brush rolls of the fruit washer into a drip pan 21 and is returned through pipe 22 to the soaking tank. A drip board 23 is also provided to return drip from the elevator 14 to said tank.

After receiving a thorough rubbing and scrubbing in the washer 16, the cleansed and treated fruit is delivered over a chute board 24 to suitable conveyor means indicated conventionally at 25. Advantageously this conveyor means may be of such character and arrangement that the fruit, wet with the treating solution, remains upon it for a substantial period of time sufficient to ensure thorough and efficient action of the mold-inhibiting agent on the fruit. Said conveyor may therefore be relatively long and may also advance the fruit circuitously to the next stage of operations. The conveyor discharges fruit over chute board 26 to drier of any well known suitable type indicated conventionally at 27. In order to avoid having the surface of the fruit rendered uncommercial by unsightly deposits of solid mineral matter as a result of the treatment with the mold-inhibiting solution, it is sometimes advantageous, although not essential in the broader aspects of the invention, to subject the fruit, prior to its entry into drier 27, to a carefully restricted and controlled rinsing with plain water to remove superficial excess of the mineral matter. This may be accomplished, for instance, by locating a rinsing or sprinkling device over the conveyor 25 slightly in advance of the point at which it delivers fruit to the drier. In the present example, the device may comprise a small tank 28 having a line of discharge outlets 29 in its bottom extending transversely of said conveyor. Plain water is supplied to the tank through pipe 30 and a constant level is maintained in the tank by means of float-controlled valve 31. In this way exactly the right amount of rinsing water may be showered on the fruit as it passes under the rinsing device.

In the drier 27, the sensible surface moisture of the fruit is removed. If the fruit was rinsed before being dried, as in the typical example just given, it usually requires no further treatment before application of the waxy protective material which, as already indicated, is optional although desirable. Where the fruit has not been so rinsed, however, and in cases where the rinsing is not so complete as to certainly preclude the possibility of some substantial mineral deposit on the dry surface of the fruit, it is desirable to provide means for removing all or substantially all of such surface deposit prior to applying the waxy protective material. To this end, the fruit leaving drier 27 may be delivered over chute board 32 to suitable brushing and rubbing means which may desirably be of the brush roll type indicated generally at 33, the general construction of which may be similar to the washer unit 16, the spray heads being omitted, however, and the surface of the rotary brush rolls being advantageously of soft bristles such as horsehair. The white powder deposit of mineral matter which may be left on the surface of the fruit after it has passed through the drier, is dusted off by these rolls which may be driven at relatively high speed.

From the brush roll mechanism 33, the fruit then rolls down over chute board 34 to another brush roll mechanism indicated generally at 35, above which, near the upper or receiving end, is located suitable spraying means, such as air brushes indicated conventionally at 36, said air brushes serving to spray fluid coating material in small quantity down upon the fruit as it enters units 35. Most desirably this coating material comprises paraffin and a light mineral oil solvent thereof thoroughly intermingled to provide a thinly fluid mixture that can be spread in an extremely thin film over the fruit by the action of the brush rolls.

After receiving a small amount of coating material from the air brushes upon entering brush roll unit 35, the fruit continues to pass down the brush roll runway or runways and is subjected to a very thorough rubbing by the horsehair surfaces thereof, the coating material applied to each fruit being spread out into an extremely thin protective film coating. Upon leaving unit 35, the fruit passes over chute board 37 and may optionally travel through a fruit drier 38 where the solvent in the paraffin composition, if a volatile solvent is employed, may be evaporated to a greater or less extent. Leaving the drier over chute board 39, the fruit then goes to the graders and sizers and is ready to be shipped in the usual manner except that pre-cooling and refrigeration are unnecessary, provided the cars in which the fruit is shipped are reasonably well ventilated. Pre-cooling and refrigeration are also unnecessary where the fruit does not receive an application of paraffin composition.

Where it is desired to apply the treating solution to the fruit under pressure, this may be effected in various ways. For instance, the passage of the fruit through the tank 11 may be so regulated and controlled as to cause the fruit to pile up several layers deep in the treating tank, thus subjecting the lower layers to a hydrostatic pressure corresponding to a submergence of say 18 inches to 2 feet or more, and provision may be made to agitate the fruit in the tank in such manner as to cause the upper and lower layers of fruit to exchange places and thus expose all the fruit passing through the tank to the aforesaid hydrostatic pressure of the treating solution. It is also feasible to employ mechanical means to maintain the fruit submerged well below the surface of the solution throughout its travel through the tank 11 which, of course, may be much longer than is diagrammatically indicated in the drawing. Such expedients for applying the solution under pressure require no further explanation here as in and of themselves they constitute no part of the present invention.

The present application contains subject-matter divided out of our prior co-pending application, Serial Number 657,215, filed August 13, 1923; issued as Patent 1,529,461 of March 10, 1925, and is a continuation in part thereof.

What is claimed is:

1. In the preparation of fresh fruit for market, the process of protecting the same against blue mold decay and the like which comprises subjecting fresh fruit to the action, under super-atmospheric pressure, of a warm aqueous mold-inhibiting solution containing borax and sodium carbonate in the proportion of at least 2 ounces of each per gallon.

2. In the preparation of fresh fruit for market, the process of protecting the same against blue mold decay and the like which comprises subjecting fresh fruit to the action, under super-atmospheric pressure, of a warm aqueous mold-inhibiting solution containing borax, sodium carbonate, and sodium bisulfite in the proportion of at least 2 ounces of each per gallon.

3. In the preparation of fresh fruit for market, the process of protecting the same against blue mold decay and the like which comprises applying to the fresh fruit an aqueous solution containing alkali-metal oxid radical and boric acid radical in proportions equivalent to the employment of from 2 to 12 ounces of borax and from 2 to 12 ounces of sodium carbonate per gallon of water, the fluidity, strength and temperature of said solution, and the duration of the treatment, being such that exposed rind or skin tissues of the fruit are effectively impregnated and rendered resistant to blue mold decay, while at the same time the fruit is not scalded nor is its freshness or edibility otherwise substantially impaired.

4. In the preparation of fresh fruit for market, the process defined in claim 3, further characterized by the fact that effective impregnation is furthered by rubbing the fruit while wet with said solution, and by the fact that a substantial residue of the treating reagent remains on the surface of the fruit after drying.

5. An improved process for preparing fresh fruits and vegetables for market, which comprises the application to the surface of such articles of an aqueous solution containing the sodium oxide radical and the boric acid radical in equal proportions and of such a strength as to effectively retard the growth and development of the organisms that cause stem-end rot, blue-mold rot, and other forms of decay.

6. An improved process for preparing fresh fruits and vegetables for market which comprises the application to the surface of such articles of a solution containing approximately 5 parts by weight of borax and 1.39 parts by weight of anhydrous sodium carbonate in 100 parts by weight of water, to effectively retard the growth or development of the organisms causing stem-end rot, blue-mold rot, or other forms of decay.

7. In the preparation of fresh fruit for market, the process of protecting the same against blue mold decay and the like which comprises applying to the fresh fruit a mold-inhibiting solution at a temperature above 100° F. containing between 2 and 12 ounces each, per gallon, of borax and sodium carbonate, and maintaining the fruit wet with said solution for at least 2 minutes and most desirably for from 5 to 15 minutes, the fluidity, strength and temperature of said solution, and the duration of the treatment, being such that exposed rind or skin tissues of the fruit are effectively impregnated with the solution and rendered resistant to blue mold decay, while at the same time the fruit is not scalded nor is its freshness or edibility otherwise substantially impaired.

8. In the preparation of fresh fruit for market, the process of protecting the same against blue mold decay and the like which comprises rubbing fresh fruit with a warm aqueous solution containing at least 2 ounces each of borax and sodium carbonate per gallon, without previous washing or wetting of the fruit with a non-mold-inhibiting liquid.

9. In the preparation of fresh fruit for market, the process of protecting the same against blue mold decay and the like which comprises impregnating exposed rind or skin tissues of fresh fruit with a mixture of borax and sodium carbonate in aqueous solution of mold-inhibiting strength, with the borax present to the amount of from 2 to 12 ounces per gallon of water and the sodium carbonate constituting up to 50 per cent of the mixture, the temperature of said solution being insufficiently high to scald or cook the fruit, and the fruit being caused to remain wet with the solution for at least about two minutes.

10. In the preparation of fresh fruit for market, the process of protecting the same against blue mold decay and the like which comprises impregnating exposed rind or skin tissues of fresh fruit with borax and sodium carbonate in aqueous solution of combined mold-inhibiting strength of said borax and carbonate with the carbonate constituting about 50% of the mixture of borax and carbonate, and maintaining the fruit wet with said solution for at least about two minutes.

In testimony whereof we hereunto affix our signatures.

ERNEST M. BROGDEN.
MILES L. TROWBRIDGE.